(12) United States Patent
Choi

(10) Patent No.: US 7,527,132 B2
(45) Date of Patent: May 5, 2009

(54) RETRACTOR APPARATUS FOR ELECTRICAL CORD

(75) Inventor: Hon Man Choi, Hong Kong (CN)

(73) Assignee: Hon Way Plastic & Metal Mfg. Co. Ltd., Kowloon, Hong Kong SAR (CN)

( * ) Notice: Subject to any disclaimer, the term of this patent is extended or adjusted under 35 U.S.C. 154(b) by 0 days.

(21) Appl. No.: 11/867,259

(22) Filed: Oct. 4, 2007

(65) Prior Publication Data

US 2009/0090803 A1    Apr. 9, 2009

(51) Int. Cl.
*H02G 11/00* (2006.01)
(52) U.S. Cl. .................................. 191/12.2 R
(58) Field of Classification Search ............... 191/12 R, 191/12.2 R, 12.4, 12.2 A, 12 S; 242/370, 242/371, 376, 376.1, 379
See application file for complete search history.

(56) References Cited

U.S. PATENT DOCUMENTS 1,348,752 A * 8/1920 Shaw .................... 191/12.2 R
4,713,497 A * 12/1987 Smith .................... 191/12.2 R

* cited by examiner

*Primary Examiner*—Mark T Le
(74) *Attorney, Agent, or Firm*—Leydig, Voit & Mayer, Ltd.

(57) ABSTRACT

A modular cord retractor apparatus includes a spring-driven reel and may be used with a range of different electrical appliances incorporating a dual conductor cord. Fixed and rotating electrical contact pairs provide power to the cord and reduce noise and wear. Rotating contacts are disposed at axially opposing ends of an axle assembly supporting the reel. Each rotating contact has a contact surface intersecting the axis and each fixed contact is mounted to a fixed reel mount. The axle assembly includes first and second axle portions of a dielectric material, each receiving a respective electrically-conductive strip, with the rotating contacts located proximate one end of each strip.

3 Claims, 4 Drawing Sheets

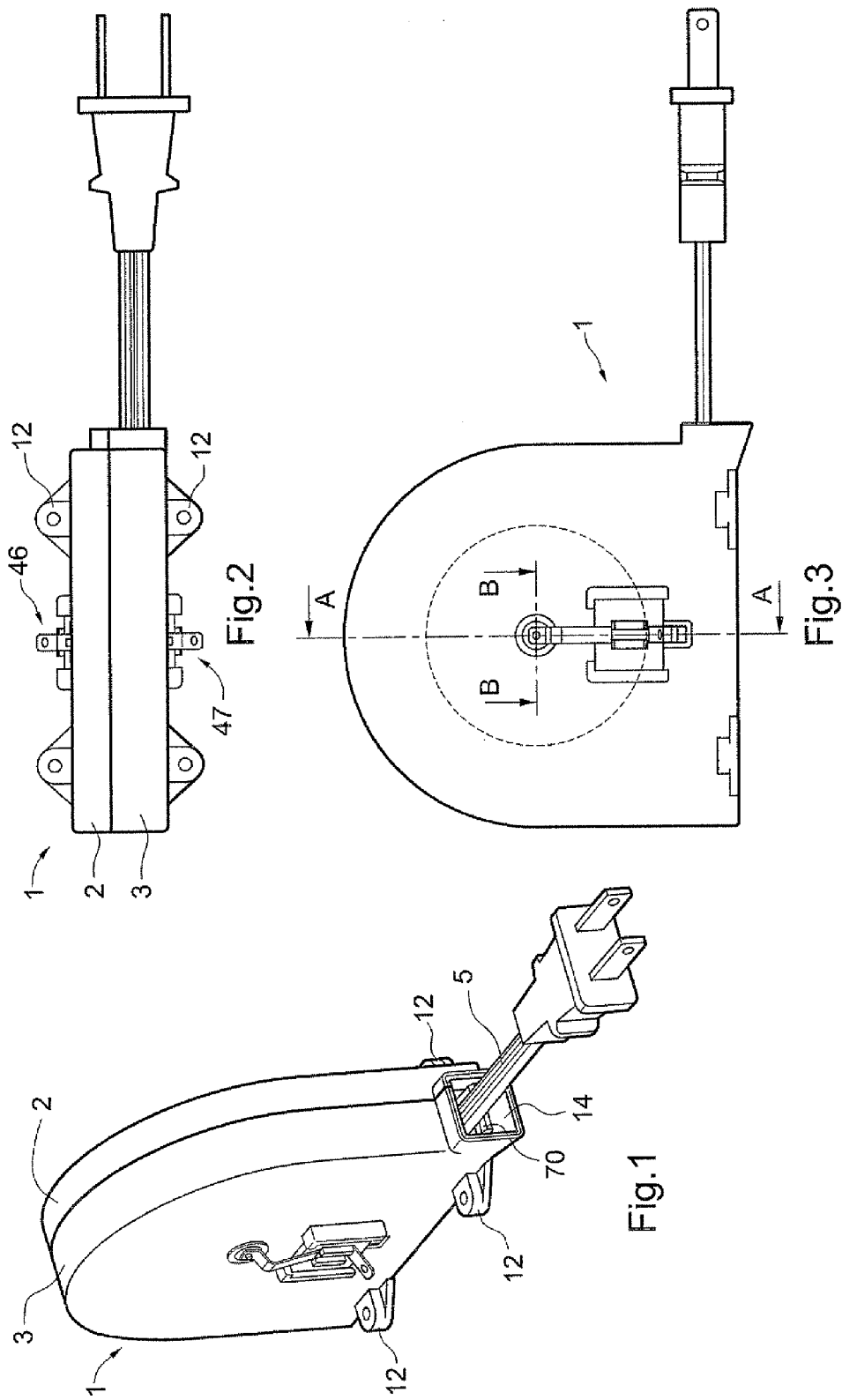

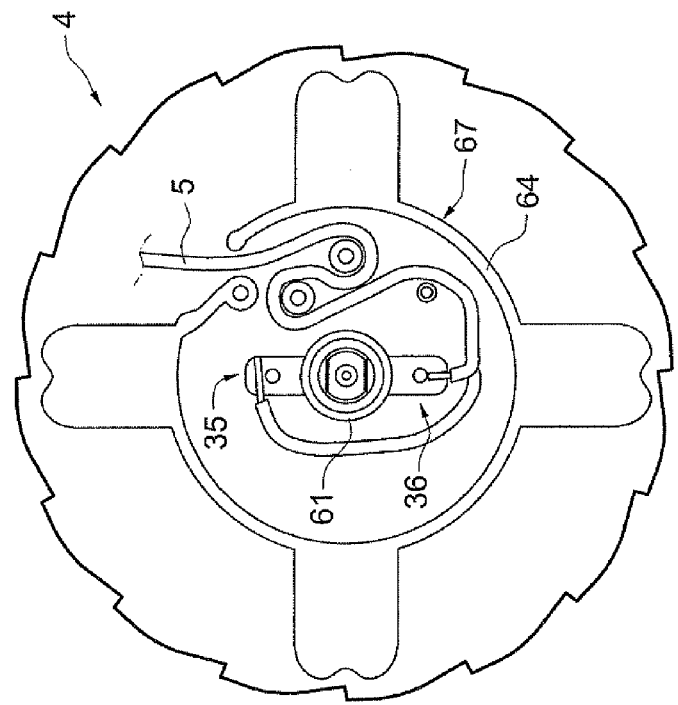
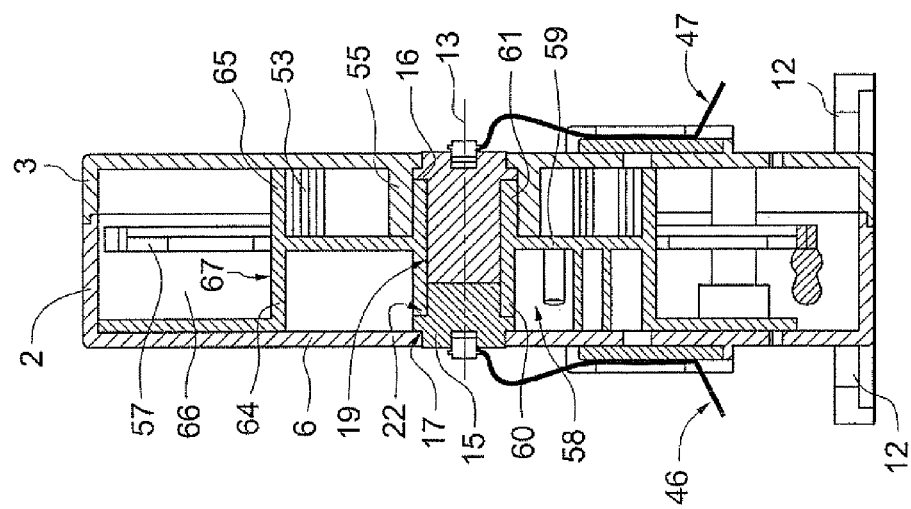

RETRACTOR APPARATUS FOR ELECTRICAL CORD

TECHNICAL FIELD

The present invention relates generally to electrical appliances operated by mains power, and particularly to cord retractor apparatus for use in such appliances.

BACKGROUND OF THE INVENTION

Some domestic electric appliances are provided with an automatic retractor apparatus for winding up the power supply cord. However, these prior art retractor apparatus cannot be directly adapted to a range of different appliances due to their reliance upon specific structure provided on the appliance. It will therefore be understood that there is a need for a modular apparatus, one that could be used, for instance, in all in the appliances in a manufacturer's product range. Such a modular device should be compact and inexpensive to manufacture.

Typically, slip rings of two different diameters are used to transmit electricity between the relatively fixed and rotating parts in an automatic retractor apparatus. However, the sliding contact in such connections is disadvantageous because of the resulting wear of the contacts and because it produces noise with can interfere with the proper performance of sensitive electrical circuits. It is an object of the present invention to address or substantially ameliorate the above disadvantages or more generally to provide an improved cord retractor apparatus.

DISCLOSURE OF THE INVENTION

According to one aspect of the present invention there is provided retractor apparatus for a dual conductor cord, comprising:

first and second reel mounts with respective first and second axle-receiving recesses therein;

a reel for receiving the cord;

an axle assembly, opposing ends of the axle assembly being received in the first and second axle-receiving recesses for supporting the reel for rotation about an axis of the axle assembly;

first and second mutually engaged electrical contact pairs, each pair configured for supplying current to a respective conductor of the cord, each pair including a rotating contact mounted to rotate with the reel and a fixed contact, wherein the rotating contacts are disposed at axially opposing ends of the axle assembly, each rotating contact has a contact surface intersecting with the axis and each fixed contact is mounted to a respective one of the first and second reel mounts.

Preferably the axle assembly comprises first and second axle portions each with a coaxial cylindrical face received in the first and second axle-receiving recesses respectively, the first and second axle portions are of a dielectric material and receive respective electrically-conductive strips, wherein the rotating contacts are formed proximate one end of each strip and protrude axially from the one end of the strip, and soldered connections to each conductor are provided at an opposing end of each strip.

Preferably the first and second reel mounts comprise first and second housing shells respectively, the housing shells cooperating to enclose the reel, a central aperture extends axially through the reel, each of the first and second axle portions is received in the central aperture from axially opposing ends thereof, each first and second axle portions has a shoulder by which it is located axially in the central aperture and an external surface of each first and second axle portion is complementary to an internal surface of the aperture so as to prevent relative rotation about the axis between the first and second axle portions and the reel.

Preferably the apparatus further comprises:

a retractor spring for rotating the reel in a first direction to wind up the cord;

a ratchet wheel integral the reel;

a pawl engaging the ratchet wheel to prevent rotation of the reel in the first direction, and a release lever integral with the pawl for pivoting the pawl to disengage from the ratchet wheel, wherein a hub portion of the reel comprises a radially aligned wall portion with first and second bosses protruding from axially opposing sides thereof, the central aperture extending axially through the bosses for receiving the axle assembly;

first and second substantially cylindrical wall portions are aligned substantially coaxially with the axis and protrude from axially opposing sides of the wall portion, and the spring is received in an annular recess between the first boss and first cylindrical wall portion, and the soldered connections are received in an annular recess between the second boss and second cylindrical wall portion and the cord.

Preferably the pawl and release lever are enclosed between the housing shells and each fixed contact is mounted externally to a respective one of the housing shells.

This invention provides a device which is effective and efficient in operational use, which may be economically constructed and which by its modular construction reduces appliance manufacturing costs. Moreover, by providing contact pairs, both with contact surfaces intersecting the axis of the reel problems associated with sliding contact are avoided or reduced.

BRIEF DESCRIPTION OF THE DRAWINGS

Preferred forms of the present invention will now be described by way of example with reference to the accompanying drawings, wherein:

FIG. 1 is a pictorial view of a preferred embodiment of a cord retractor apparatus of the invention;

FIG. 2 is a plan view of the apparatus of FIG. 1;

FIG. 3 is a side elevation of the apparatus of FIG. 1;

FIG. 5 is a cross section along line AA of FIG. 3;

FIG. 6 is a cross section along line BB of FIG. 3 with the strips 46, 46 omitted for clarity;

DESCRIPTION OF THE PREFERRED EMBODIMENTS

Figure 4:
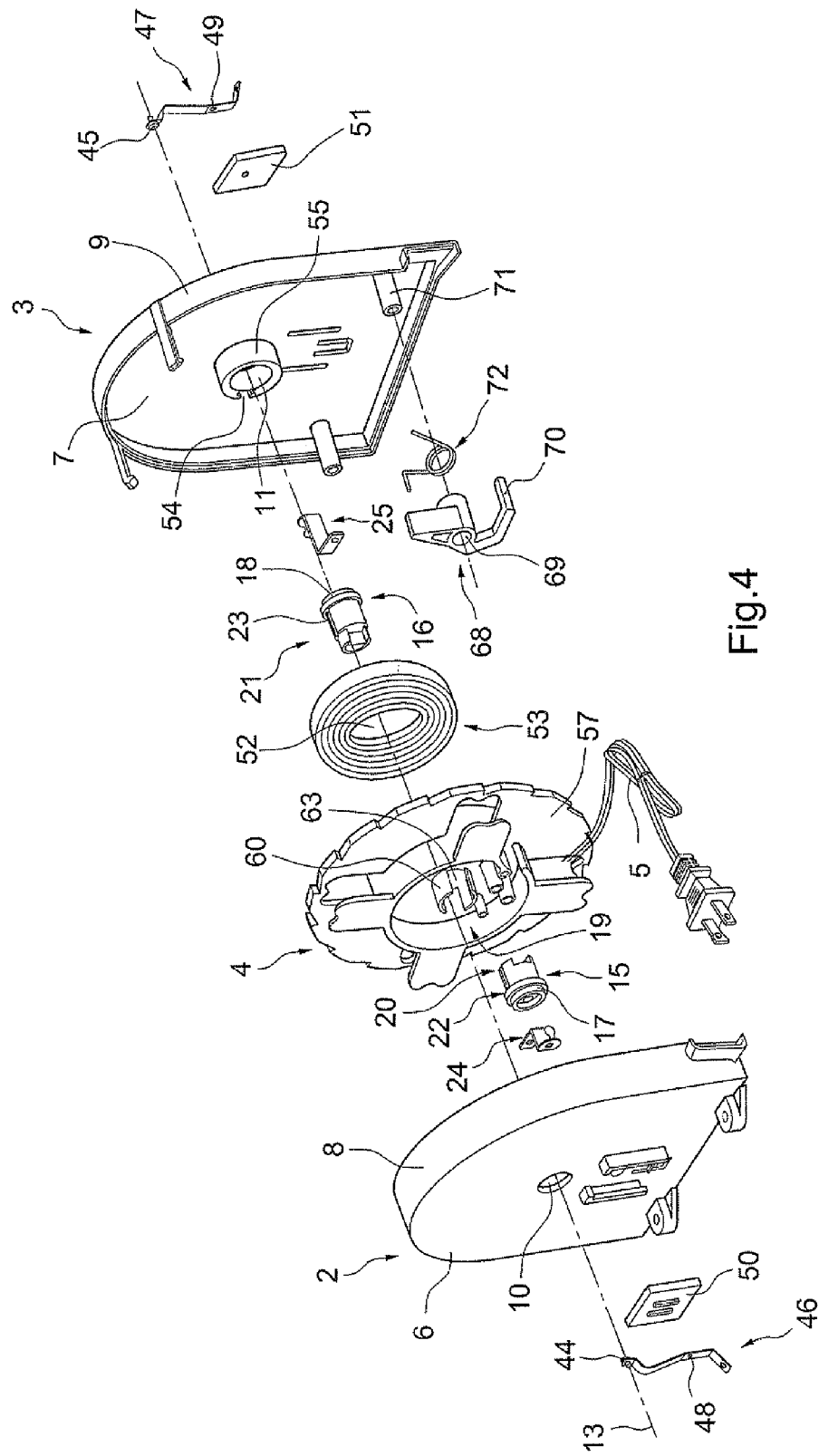
FIG. 4 is an exploded view of the apparatus of FIG. 1.
Figure 8:
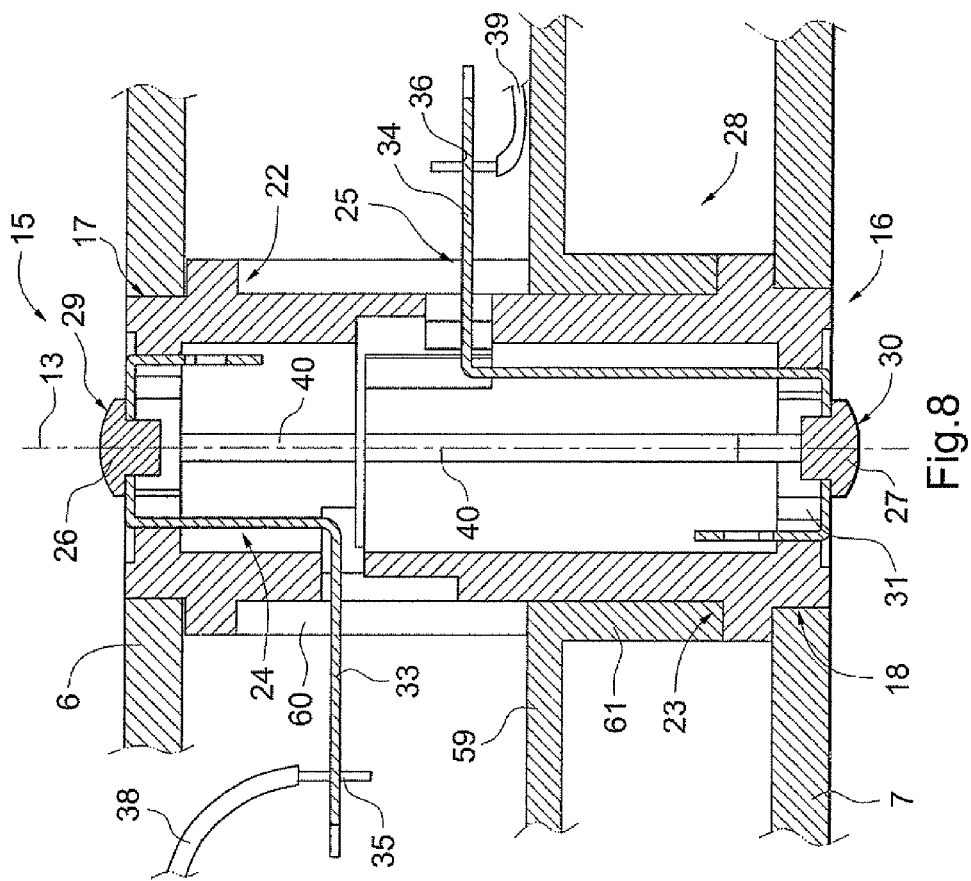
FIG. 8 is a second side view of the reel of FIG. 6.
Figure 7:
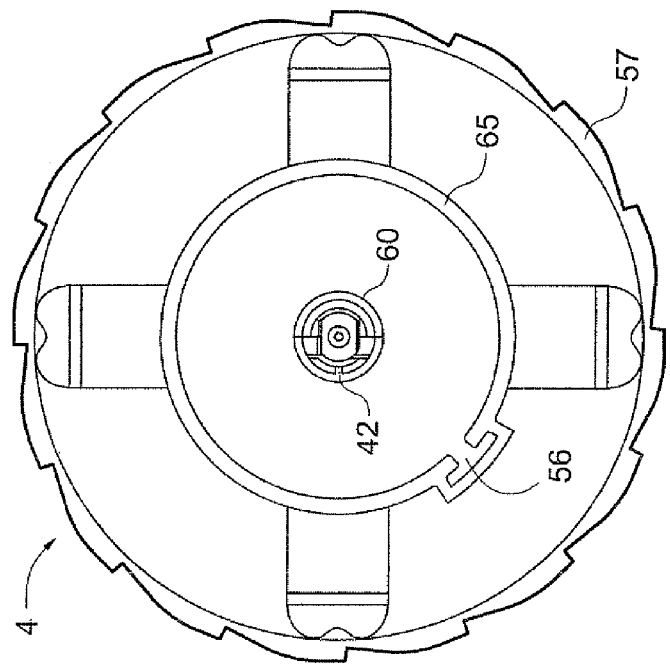
FIG. 7 is a first side view of the reel of the apparatus of FIG. 1.

Referring to the drawings, cord retractor apparatus 1 includes housing shells 2, 3 which cooperate to mount and enclose a reel 4 upon which a dual conductor cord 5 is wound. The major walls 6, 7 of the shells 2, 3 are substantially parallel. Generally perpendicular to the major wall 6, 7 and extending substantially about their respective peripheries are side walls 8, 9 of like shape. The cord 5 extends from a mouth opening 14 in the side walls 8, 9 adjacent the base of the shells 2, 3. The major walls 6, 7 provide reel mounts and each include an axle-receiving recess 10, 11 aligned with axis 13. The shells 2, 3 include coplanar mounting flanges 12 at their base.

An axle assembly 28 includes first and second axle portions 15, 16 each with a coaxial cylindrical face 17, 18 received in the first and second axle-receiving recesses 10, 11 respectively. Each cylindrical face 17, 18 is formed at an outer end of the axle portions 15, 16 and between the respective inner ends 20, 21 and the cylindrical face 17, 18 are shoulders 22, 23.

The first and second axle portions 15, 16 are of a dielectric material, preferably a polymer, and receive respective copper conductor strips 24, 25. Formed on the strips 24, 25 are respective contacts 26, 27 disposed at axially opposing ends of the axle assembly 28. Each contact 24, 25 has a contact surface 29, 30 intersecting with the axis 13 and protruding from an axially outer part 37 of the strip 24, 25, and also from the axial end of the axle assembly 28. The end of the strips 24, 25 proximate the contacts 26, 27 are secured around four sides of a transverse section 31, 32 of the axle portions 15, 16. The longitudinally opposing end 33, 34 of each strip 24, 25 extend radially out from the respective axle portion 15, 16 where soldered joints 35, 36 are made to connect the strips 24, 25 to respective conductors 38, 39 of the cord. Slots 40, 41 are provided in the inner end 20, 21 for receiving ribs 42, 43 formed on diametrically opposing sides of the aperture 19, thereby preventing rotation of the axle portions 15, 16.

For engagement with the rotating contacts 26, 27, fixed contacts 44, 45 are provided upon copper strips 46, 47 mounted externally to the shells 2, 3 respectively. A rivet (not shown) connects a central part of each of the strips 46, 47 to a rectangular mounting block 50, 51. Opposite edges of the mounting block are received in channels formed on the walls 6, 7. The contact pairs 44, 26 and 45, 27 are urged together by resilient action of the strips 46, 47.

The reel 4 includes an integral ratchet wheel 57. A hub portion 58 of the reel comprises a radially aligned wall portion 59 with first and second bosses 60, 61 protruding from its axially opposing sides. The first boss 60 includes axial slots 62, 63 opposing one another for receiving the ends 33, 34. The central aperture 19 extends axially through the bosses 60, 61. Protruding from axially opposing sides of the wall portion 59 are first and second substantially cylindrical wall portions 64, 65 aligned substantially coaxially with the axis 13.

The inner end 52 of a coil spring 53 is fastened in a recess 54 provided in a protrusion 55 extending inwardly on the wall 7 about the recess 11. The outer end of the spring 53 is engaged in a recess 56 such that the spring acts to wind up the cord 5. The spring 53 is received in an annular recess between the protrusion 55 and first cylindrical wall portion 65.

The soldered connections 35, 36 are received in an annular recess 66 between the second boss 61 and second cylindrical wall portion 64. The second cylindrical wall portion 64 has a cylindrical face 67 with which the first turn of the cord is engaged.

A pawl 68 is urged by a torsion spring 72 to engage the ratchet wheel 57 to prevent rotation of the reel tending to unwind the cord. The pawl 68 has an opening 69 and integral release lever 70. A shaft 71 integral with the shell 3 is received in the opening 69 to pivotably mount the pawl 68. The release lever 70 is positioned just inside the mouth 14 for actuation by movement of the cord 5.

In use the cord retractor apparatus 1 is mounted within an electrical appliance. Electrical power supply connections to the appliance are made to the strips 46, 47 on either side of the apparatus 1.

Aspects of the present invention have been described by way of example only and it should be appreciated that modifications and additions may be made thereto without departing from the scope thereof.

The invention claimed is:

1. A retractor apparatus for a dual conductor cord, comprising:
   first and second reel mounts with respective first and second axle-receiving recesses in the first and second reel mounts;
   a reel for receiving a dual conductor cord;
   an axle assembly having opposing ends received in the first and second axle-receiving recesses and supporting the reel for rotation about an axis of the axle assembly and comprising first and second axle portions, the first and second axle portions having coaxial cylindrical faces received in the first and second axle-receiving recesses, respectively, wherein the first and second axle portions are a dielectric material and receive respective electrically-conductive strips; and
   first and second mutually engaged electrical contact pairs, each electrical contact pair supplying current to a respective conductor of the dual conductor cord and including a rotating contact, mounted to rotate with the reel, and a fixed contact, wherein
      the rotating contacts are located proximate first ends of respective electrically-conductive strips and protrude axially from the first ends of the respective electrically-conductive strips,
      the rotating contacts include soldered connections to each conductor of the dual conductor cord and located at respective second ends of the electrically-conductive strips,
      the rotating contacts are disposed at axially opposing ends of the axle assembly,
      each rotating contact has a contact surface intersecting the axis,
      each fixed contact is mounted to a respective one of the first and second reel mounts,
      the first and second reel mounts comprise first and second housing shells, respectively, the first and second housing shells cooperating to enclose the reel,
      a central aperture extends axially through the reel,
      each of the first and second axle portions is received in the central aperture from axially opposing ends of the central aperture,
      each of the first and second axle portions has a shoulder by which the axle portion is located axially in the central aperture, and
      an external surface of each of the first and second axle portions is complementary to an internal surface of the central aperture to prevent relative rotation about the axis between the first and second axle portions and the reel.

2. The apparatus of claim 1 further comprising:
   a retractor spring for rotating the reel in a first direction to wind the cord;
   a ratchet wheel integral with the reel;
   a pawl engaging the ratchet wheel to prevent rotation of the reel in the first direction;
   a release lever integral with the pawl for pivoting the pawl to disengage from the ratchet wheel, wherein the reel includes a hub portion comprising a radially aligned wall portion with first and second bosses protruding from axially opposing sides of the hub portion, the central aperture extending axially through the bosses for receiving the axle assembly; and first and second substantially cylindrical wall portions aligned substantially coaxially with the axis and protruding from axially opposing sides of the wall portion, wherein the spring is received in a first annular recess between the first boss and the first cylindrical wall portion, and the soldered connections are received in a second annular recess between the second boss and the second cylindrical wall portion and the cord.

3. The apparatus of claim 2 wherein the pawl and the release lever are enclosed between the first and second housing shells and each fixed contact is mounted externally to a respective one of the first and second housing shells.

* * * * *